US008631170B2

(12) United States Patent
Tsirkin et al.

(10) Patent No.: US 8,631,170 B2
(45) Date of Patent: Jan. 14, 2014

(54) MEMORY OVERCOMMIT BY USING AN EMULATED IOMMU IN A COMPUTER SYSTEM WITH A HOST IOMMU

(75) Inventors: Michael Tsirkin, Yokneam (IL); Christopher M. Wright, Portland, OR (US)

(73) Assignee: Red Hat Israel, Ltd., Raanana (IL)

( * ) Notice: Subject to any disclaimer, the term of this patent is extended or adjusted under 35 U.S.C. 154(b) by 107 days.

(21) Appl. No.: 12/883,571

(22) Filed: Sep. 16, 2010

(65) Prior Publication Data

US 2012/0072619 A1    Mar. 22, 2012

(51) Int. Cl.
*G06F 13/28* (2006.01)
*G06F 9/34* (2006.01)

(52) U.S. Cl.
USPC ............... 710/26; 710/22; 711/202; 711/203; 711/210

(58) Field of Classification Search
None
See application file for complete search history.

(56) References Cited

U.S. PATENT DOCUMENTS

| | | | |
|---|---|---|---|
| 6,725,289 B1 * | 4/2004 | Waldspurger et al. | 710/9 |
| 6,804,729 B2 * | 10/2004 | Swanberg | 710/22 |
| 7,421,533 B2 * | 9/2008 | Zimmer et al. | 711/6 |
| 7,636,800 B2 * | 12/2009 | Ben-Yehuda et al. | 710/28 |
| 8,086,822 B2 * | 12/2011 | Devine et al. | 711/206 |
| 8,230,155 B2 * | 7/2012 | Oshins | 711/6 |
| 2006/0143350 A1 * | 6/2006 | Miloushev et al. | 710/242 |
| 2006/0236063 A1 * | 10/2006 | Hausauer et al. | 711/170 |
| 2007/0162641 A1 * | 7/2007 | Oztaskin et al. | 710/22 |
| 2007/0168641 A1 | 7/2007 | Hummel et al. | |
| 2007/0299990 A1 | 12/2007 | Ben-Yehuda et al. | |
| 2008/0082696 A1 | 4/2008 | Bestler | |
| 2008/0133709 A1 | 6/2008 | Aloni et al. | |
| 2009/0276544 A1 | 11/2009 | Arndt et al. | |
| 2010/0070729 A1 | 3/2010 | Ng et al. | |
| 2011/0161619 A1 * | 6/2011 | Kaminski et al. | 711/207 |
| 2011/0161620 A1 * | 6/2011 | Kaminski et al. | 711/207 |
| 2012/0072906 A1 | 3/2012 | Tsirkin | |
| 2012/0290766 A1 | 11/2012 | Oshins | |

OTHER PUBLICATIONS

"AMD I/O Viritualization Technology (IOMMU) Specification", *AMD IOMMU Architectural Specification, Section 2.2.6—Virtualizing the IOMMU*, PID 34434, Rev. 1.26, (Feb. 2009), 2, 4, 22.
"Intel Virtualization Technology for Directed I/O, Architecture Specification", Rev. 1.2, Order No. D51397-004, Section 2.5.1.3—*DMA Remapping Usages by Guests*, (Sep. 2008), 1-8, 15, 16.

(Continued)

*Primary Examiner* — Henry Tsai
*Assistant Examiner* — Michael Sun
(74) *Attorney, Agent, or Firm* — Lowenstein Sandler LLP (57) ABSTRACT

A method and system for managing direct memory access (DMA) in a computer system that hosts virtual machines and allows memory overcommit. The computer receives an indication that a bus address is to be used by a device to perform DMA to a buffer. In response to the indication, the computer determines a host device identifier for the device, and pins a memory page addressed by a host address that is associated with the bus address and a guest address. The computer also records, in a host I/O memory management unit (IOMMU), a mapping of the bus address and the host device identifier to the host address. After the device completes the DMA, the computer removes the mapping from the host IOMMU to prevent further direct access to the host address.

23 Claims, 10 Drawing Sheets

(56) References Cited

OTHER PUBLICATIONS

"Why is IO Virtualization the Next Big Thing?", *VMWorld*, Breakout Session #2600, Speaker: Andy Kegel, Sr. MTS, AMD, (2008), 1-22.

Willmann, Paul, et al., "Protection Stragegies for Direct Access to Virtualized I/O Devices", www.usenix.org/events/usenix08/tech/full_papers/willmann_html, printed from Internet on Jul. 22, 2010, (2008), 1-22.

Yassour, Ben-Ami, et al., "Direct Device Assignment for Untrusted Fully-Virtualized Virtual Machines", *IBM Research Report, Computer Science*, IBM Research Division, Haifa, Israel, (Sep. 20, 2008), i, 1-8.

Office Action for U.S. Appl. No. 12/883,576, mailed Dec. 4, 2012.

Office Action for U.S. Appl. No. 12/883,576, mailed Apr. 12, 2013.

* cited by examiner

MEMORY OVERCOMMIT BY USING AN EMULATED IOMMU IN A COMPUTER SYSTEM WITH A HOST IOMMU

TECHNICAL FIELD

Embodiments of the present invention relate to a computer system, and more specifically, to the management of DMA transactions in a virtual machine system.

BACKGROUND

Direct memory access (DMA) allows hardware devices in a computer to access system memory for reading and/or writing independently of the central processing unit (CPU). Hardware devices that are capable of performing DMA include disk drive controllers, graphics cards, network cards and sound cards. While a hardware device is performing the DMA, the CPU can engage in other operations. DMA is especially useful in real-time computing applications where it is critical to avoid the stalling of concurrent operations.

A computer having DMA-capable devices often uses an input/output memory management unit (IOMMU) to manage address translations. An IOMMU is a hardware memory management unit (MMU) that resides on the input/output (I/O) path connecting the device to the memory. The IOMMU maps the device address space (e.g., a bus address) that is relevant to the I/O bus into the physical address space (e.g., a host physical address) that is relevant to the memory bus. The IOMMU may also include extra information associated with the address space mapping such as read and write permissions. In a non-virtualized system (i.e., a system without virtual machines), the bus address can be the same as the host physical address.

In a virtual machine system, the guest operating system of a virtual machine usually does not know the host physical address that it accesses; instead, it operates using virtualized guest physical addresses. If the guest operating system tries to instruct a hardware device to perform DMA using the guest physical address, the hardware device would not know the mapping between the virtual and physical addresses used by the system. Thus, the DMA would be performed at the wrong address, which would likely corrupt the memory.

Further, a host system sometimes overcommits its memory to increase the number of virtual machines that it can host. Because it is unlikely that all of the virtual machines will use all of its allocated memory at the same time, the host system may allocate more memory to the virtual machines than what it actually has in the physical memory. As a result, some of the allocated memory may be swapped out to a secondary data storage when it is not in use for a period of time. If a device is allowed to perform DMA to an address not currently resident in the memory, an error will occur. Most devices cannot recover from such errors. Handling the error recovery in real time incurs significant overhead that degrades the performance of the system.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for managing direct memory access (DMA) in a computer system that hosts virtual machines and allows memory overcommit. In one embodiment, the computer receives an indication that a bus address is to be used by a device to perform DMA to a buffer. The buffer is managed by a guest operating system of one of the virtual machines, and the device is assigned to the guest operating system. In response to the indication, the computer determines a host device identifier for the device, and pins a memory page addressed by a host address that is associated with the bus address and a guest address. The bus address may be different from one or both of the host address and the guest address. The pinning of the memory page keeps the memory page in the host memory. The computer also records, in a host I/O memory management unit (IOMMU), a mapping of the bus address and the host device identifier to the host address and relevant DMA permissions (e.g., read and/or write). After the device completes the DMA, the computer removes the mapping from the host IOMMU to prevent further direct access to the host address.

According to one embodiment of the invention, the computer system includes a host IOMMU and an emulated IOMMU. The host IOMMU is a hardware device that records the mapping from a bus address and a host device identifier to a host address (or referred to as a "host physical address"). The emulated IOMMU is emulated within a hypervisor to record a mapping of a bus address and a guest device identifier to a guest address (or referred to as a "guest physical address"). The mappings in the host IOMMU and the emulated IOMMU exist only for a duration of time when a device is allowed to perform DMA to the mapped bus address. The mappings can be removed to prevent direct access to the address. The mechanism of mapping and unmapping an address in the host IOMMU and the emulated IOMMU allows a host to control access to a given host address. As a result, the host can maintain memory integrity by preventing a device from performing illegal DMA transactions or accessing invalid addresses. Direct access to a non-resident page in a memory overcommit system can also be prevented.

Throughout the following description, the term "device" is used to refer to a hardware device that is capable of performing DMA to the host memory of a computer system. Such device includes disk drive controllers, graphics cards, network cards and sound cards, etc. It is understood that other devices may be included.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
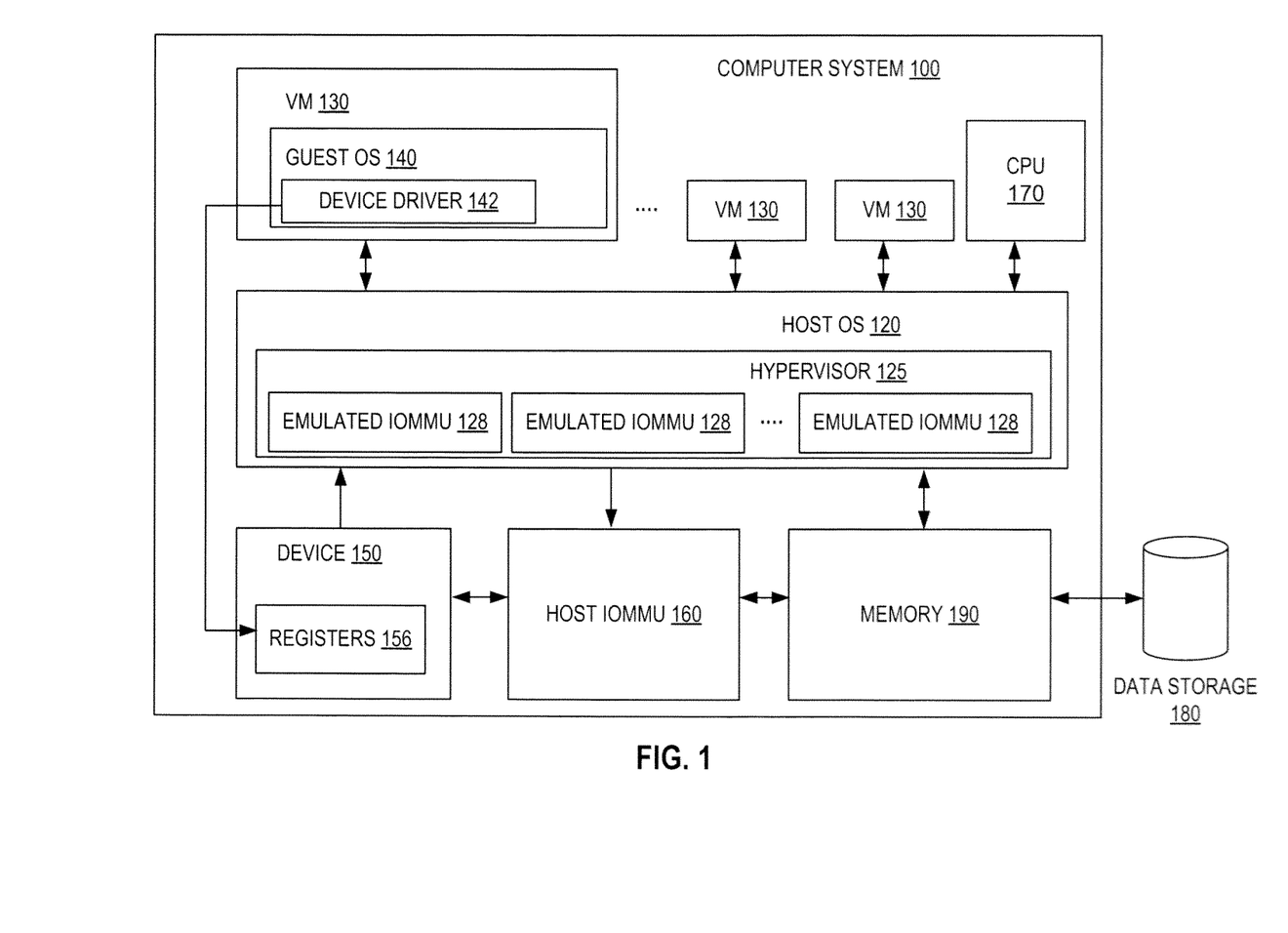
FIG. 1 is a block diagram of a computer system in which some embodiments of the invention may be implemented.

FIG. 1 is a block diagram that illustrates an embodiment of a computer system 100 that hosts a plurality of virtual machines (VM) 130. Each virtual machine 130 runs a guest operating system (OS) 140. The virtual machines 130 may have the same or different guest operating systems 140, such as Microsoft Windows®, Linux®, Solaris®, Mac® OS, etc. The computer system 100 may be a server, a workstation, a personal computer (PC), a mobile phone, a palm-sized computing device, a personal digital assistant (PDA), etc.

The computer system 100 also runs a host OS 120 to manage system resources. In one embodiment, the computer system 100 runs a hypervisor 125 to virtualize access to the underlying host hardware, making the use of the virtual machine 130 transparent to the guest operating systems 140 and the user of the computer system 100. The hypervisor 125 may also be known as a virtual machine monitor (VMM) or a kernel-based hypervisor. In some embodiments, the hypervisor 125 may be part of the host OS 120.

The computer system 100 includes hardware components such as one or more physical central processing units (CPUs) 170, memory 190 (also referred to as "host memory" or "physical memory") and other hardware components. In one embodiment, the computer system 100 includes one or more devices 150 (also referred to as "physical devices," e.g., audio/video devices, network interface devices, printers, graphics modules, etc.) that are capable of performing DMA transactions. For simplicity of the illustration, only one device 150 is shown. It is understood that the computer system 100 may include any number of devices.

In one embodiment, the device 150 includes one or more registers 156 containing addresses that are directly accessible by the device 150 in a DMA transaction. The registers 156 may store a base address and an offset to indicate an address range of a DMA buffer. The DMA buffer is in the address space allocated to one of the virtual machines 130. The DMA buffer can be used by the device 150 to directly transfer input data to the virtual machine 130 and/or directly transfer output data from the virtual machine 130. The DMA buffer may span one or more memory pages (also referred to as "pages"), with each memory page having a fixed size (e.g., a 4K-byte block).

The registers 156 in the device 150 can be written by a device driver 142 managed by the guest OS 140. The addresses in the registers 156 are referred to as bus addresses. For simplicity of discussion, only one bus address is described. It is understood that a DMA transaction may involve multiple bus addresses.

The computer system 100 includes a host IOMMU 160 that is responsible for translating the bus address and a host device identifier into a host physical address. In the embodiment of FIG. 1, the host IOMMU 160 is a separate component from the device 150. In alternative embodiments, the host IOMMU 160 may be located within the device 150.

The computer system 100 may also be coupled to a data storage 180, which may include mass storage devices, such as agnetic or optical storage based disks, tapes or hard drives.

According to one embodiment of the present invention, the computer system 100 supports over-commitment of memory, which means that the virtual address space allocated to the virtual machines 130 exceeds the available physical address space in the computer system 100. Memmory overcommit increases the number of virtual machines 130 that can co-exist in the same system, as most of the time the virtual machines 130 consume only part of its allocated memory space. When a page of virtual memory is not in use, the host operating system 120 can swap the page out to a secondary data storage (e.g., disks) and bring in another page according to a page replacement algorithm. The computer system 100 allows memory overcommit. The host memory 190 is the physical memory that can be addressed by the physical devices (e.g., the device 150). The host memory 190 is distinguishable from "guest memory," which is addressed by the guest OS 140. Memory overcommit occurs when not all of the guest memory is in the host memory 190.

In one embodiment, the hypervisor 125 includes an emulated IOMMU 128 for each virtual machine 130. The emulated IOMMU 128 is used by the guest OS 140 to communicate with the hypervisor 125 with respect to whether a bus address in a device's DMA request is "mapped." A bus address is mapped if the mapping of the bus address is recorded in the emulated IOMMU 128 and the host IOMMU 160. The memory page addressed by about physical address (which corresponds to the mapped bus address) is "pinned" in the memory 190, such that the host physical address is certain to be resident in the memory when being directly accessed. If a DMA request is made to an "unmapped" bus address, the request will be denied. The page of memory associated with an unpinned bus address can be swapped out of the memory to make room for other pages to be brought into the memory.

The mechanism of the mapping/unmapping is dynamic and is performed at real time during operation of the virtual machine 130. Using the mapping/unmapping mechanism and the associated pinning/unpinning operations, the computer system 100 can control the destination address of the DMA such that the device 150 can directly access only the memory that is resident in the computer system 100 and to which the device is authorized to access. The information from the guest OS 140 keeps the hypervisor 125 informed with respect to the active DMA transactions and allows the hypervisor 125 to control the DMA transactions for security protection of the memory. The pinning/unpinning operations ensure that the destination address of a DMA transaction will be resident in the memory. As a result, memory overcommit can be implemented without incurring errors to DMA transactions.

Figure 2:
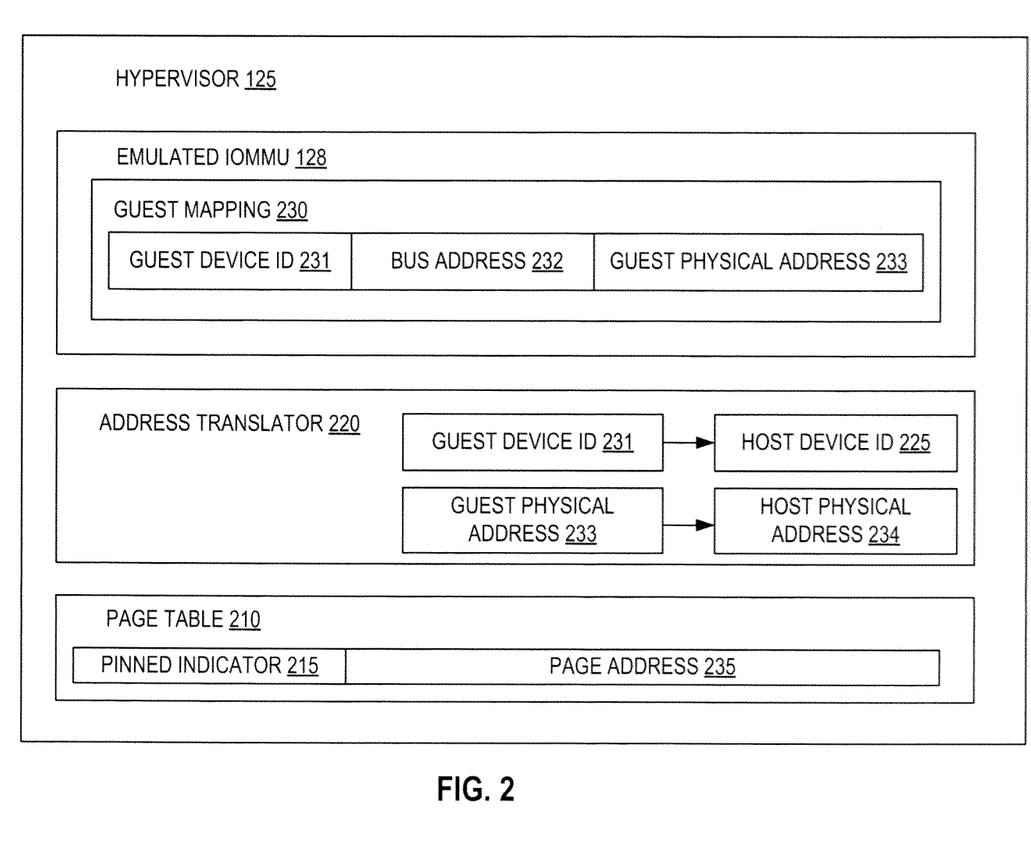
FIG. 2 is a block diagram of one embodiment of a hypervisor in a computer system and an emulated IOMMU within the hypervisor.

FIG. 2 is a block diagram that illustrates an embodiment of the hypervisor 125 and the emulated IOMMU 128. In one embodiment, the hypervisor 125 includes a page table 210 to keep track of the pages that are resident in the memory 190. The page table 210 may include a pinned indicator 215 for each page (e.g., identified as a page address 235) to indicate whether the page is "pinned." A page is "pinned" if the page is made resident in the memory 190 and cannot be swapped out to a secondary data storage. In one embodiment, the hypervisor 125 pins the pages addressed by the host physical addresses that are directly accessible by devices, such that a DMA performed by a device does not result in error due to non-resident pages.

In one embodiment, the hypervisor 125 records a guest mapping 230 in the emulated IOMMU 128. The guest mapping 230 contains an identifier of the device 150 (i.e., guest device identifier (ID) 231, which is a device identifier recognized by the guest OS 140), a bus address 232, and the corresponding guest physical address 233. The information in the guest mapping 230 indicates the bus address 232 to be directly accessible by the device 150 (as identified by the guest device ID 231). The guest physical address 233 is in the address space visible to the guest OS 140 and considered by the guest OS 140 to be its physical address space. The bus address is the address space visible to the devices 150. The bus address can be passed to the device driver 142 and programmed by the device driver 142 into the device registers 156 as an address (e.g., the base address) of the DMA buffer.

In one embodiment, the hypervisor 125 also includes an address translator 220 that translates the guest device ID 231 into a host device ID 225 (that is, a device identifier recognized by the host OS 120). For example, in a Peripheral Component Interconnect (PCI) system, the host device ID 225 is a triple (PCI bus, PCI device number, PCI function number). The corresponding guest device ID 231 may be different in one or more of the triple numbers. The address translator 220 also translates the guest physical address 233 into a host physical address 234. The host physical address 234 is the physical address space that can be used to directly address physical memory. It is understood that one or more guest physical addresses and host physical addresses may be recorded and translated in the guest mapping 230 to allow a DMA transaction by the device 150.

Figure 3:
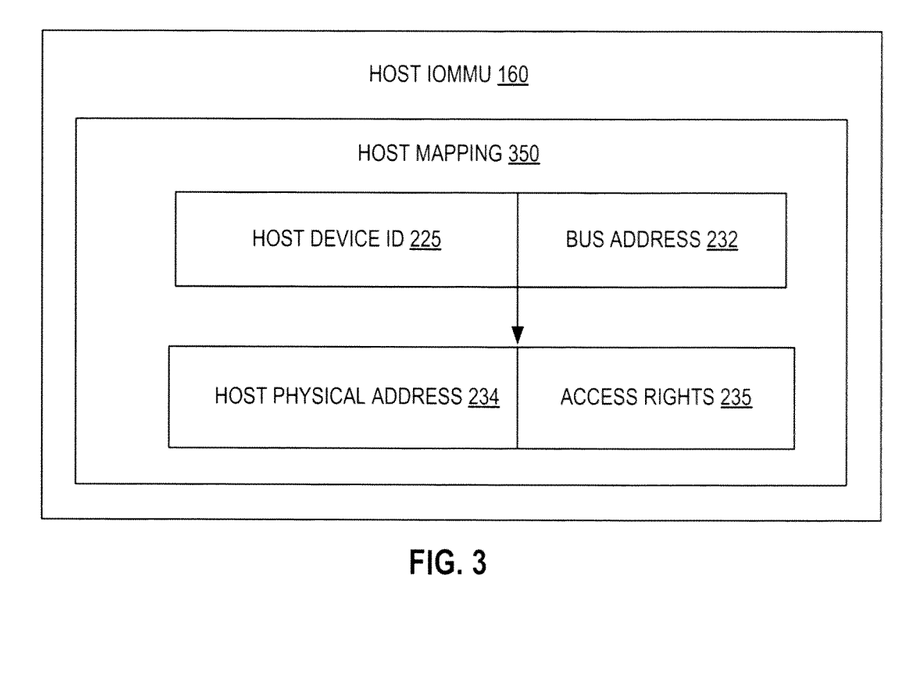
FIG. 3 is a block diagram of one embodiment of a host IOMMU in the computer system of FIG. 1.

FIG. 3 is a block diagram that illustrates an embodiment of the host IOMMU 160. The host IOMMU 160 includes a host mapping 350 that maps a (host device ID 225, bus address 232) pair into a host physical address 234 and access rights 235 (e.g., DMA permissions such as read and/or write). The host mapping 350 is programmed by the hypervisor 125 based on the information in the guest mapping 230 and the address translation result by the address translator 220. The host mapping is used to determine whether a DMA request by the device 150 can be granted.

Figure 4:
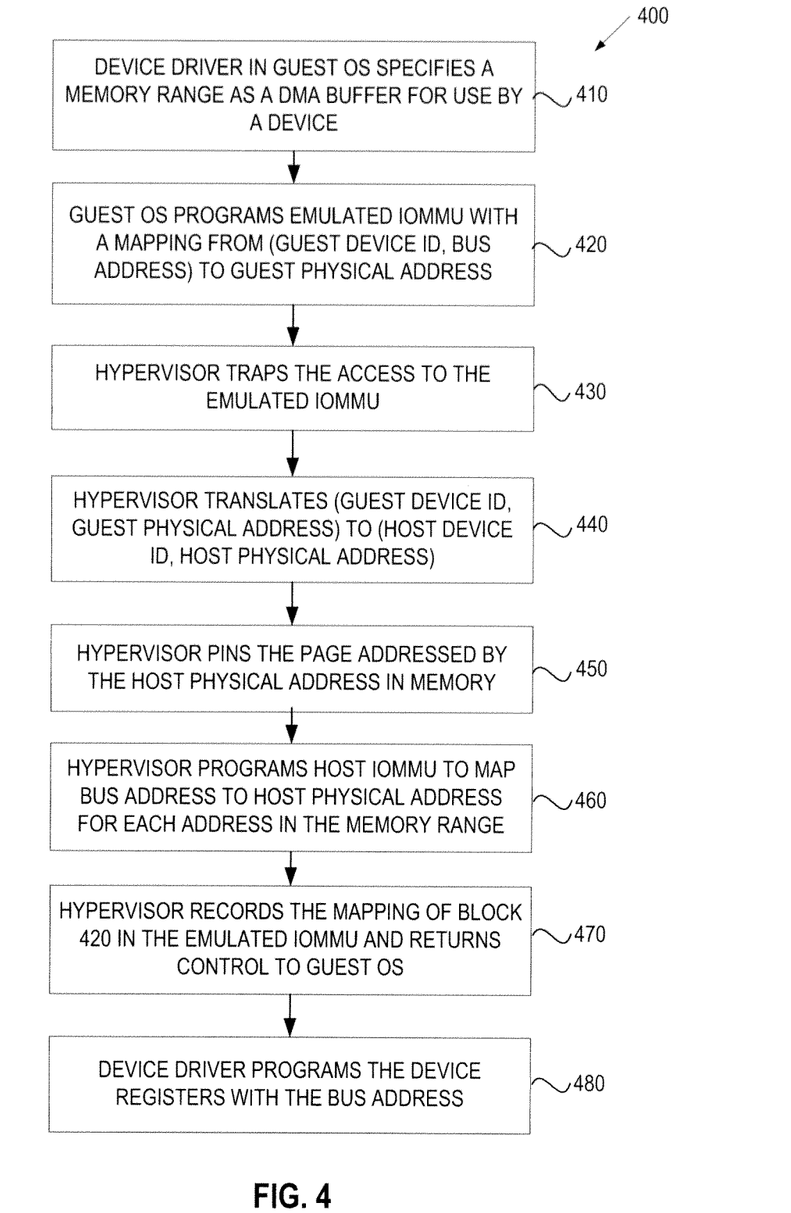
FIG. 4 is a flow diagram of one embodiment of a method for managing DMA addresses in the computer system of FIG. 1.

FIG. 4 is a flow diagram illustrating one embodiment of a method 400 for managing the DMA addresses. The method 400 may be performed by a computer system 1000 of FIG. 10 that may comprise hardware (e.g., circuitry, dedicated logic, programmable logic, microcode, etc.), software (e.g., instructions run on a processing device), or a combination thereof. In one embodiment, the method 400 is performed by the computer system 100 of FIG. 1.

Referring to FIG. 4, in one embodiment, the method 400 begins when a device driver (e.g., the device driver 142 of FIG. 1), in response to a request from the guest OS 140, specifies an address range as a DMA buffer for use by a device (e.g., the device 150 of FIG. 1) (block 410). The address range may indicate a memory size. Although a single address (e.g., a bus address) is described in connection with the following operations, it is understood that the following operations need to be performed for the addresses of each the physical pages spanned in the range from the start address (or base address) to the start address +N−1 (non-inclusive), where the N represents the memory size of the address range. The guest OS 140 allocates the specified memory size from the guest physical address space as the device's DMA buffer. The hypervisor 125 reports to the guest OS 140 that it is running on a system with an ("emulated") IOMMU 128 (the guest OS 140 typically cannot tell that the IOMMU is being emulated). Knowing the presence of the emulated IOMMU 128, the guest OS 140 programs (or attempts to program) the emulated IOMMU 128 with a mapping from the guest device ID and a bus address to a corresponding guest physical address (block 420). Each of the bus address and the guest physical address may include a base address that indicates where the DMA buffer starts, and an offset that indicates the size of the DMA buffer. Upon detection that the guest OS 140 attempts to access the emulated IOMMU 128, the hypervisor 125 traps the access (block 430) and obtains control. The hypervisor 125 translates (guest device ID, guest physical address) to (host device ID, host physical address) (block 440), and checks whether the page of memory addressed by the host physical address is resident in the host memory 190. The page is brought into the host memory 190 from a secondary data storage if it is not already in the host memory 190. Once the page is in the host memory 190, the hypervisor 125 pins the page in the host memory 190 (block 450). The hypervisor 125 may set an indicator in the page table 210 to indicate that the page is pinned and therefore cannot be swapped out of the host memory 190. The hypervisor 125 then programs the host IOMMU 160 to map the (host device ID, bus address) pair into the corresponding host physical address (block 460). The hypervisor 125 programs the mapping for each of the bus addresses to be directly accessible by the device 150. Subsequently, the hypervisor 125 records the guest mapping 230 in the emulated IOMMU 128 and returns the control to the guest OS 140 (block 470). The device driver 142 then programs the bus address and the offset (which indicates the DMA buffer size) to the registers 156 in the device 150 (block 480). At this point, the device 150 is ready to perform DMA to the DMA buffer.

Figure 5:
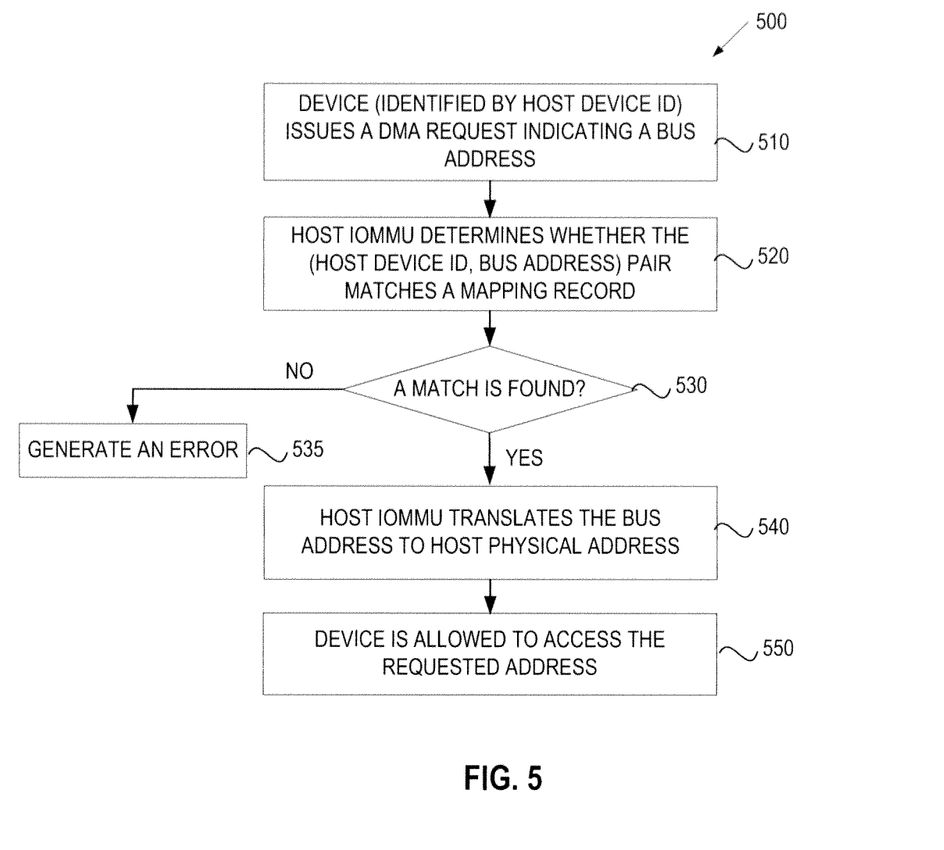
FIG. 5 is a flow diagram of one embodiment of a method for handling a DMA request issued by a device in the computer system of FIG. 1.

FIG. 5 is a flow diagram illustrating one embodiment of a method 500 for handling a DMA request from a device. The method 500 may be performed by a computer system 1000 of FIG. 10 that may comprise hardware (e.g., circuitry, dedicated logic, programmable logic, microcode, etc.), software (e.g., instructions run on a processing device), or a combination thereof. In one embodiment, the method 500 is performed by the computer system 100 of FIG. 1.

Referring to FIG. 5, in one embodiment, the method 500 begins when the device 150 (identified by a host device ID) issues a DMA request that indicates a bus address to be directly accessed (block 510). The request is interpreted by a host IOMMU (e.g., the host IOMMU 160 of FIG. 1), which lies on the I/O path between the device 150 and the host memory 190. The host IOMMU 160 determines whether the (host device ID, bus address) pair matches an existing mapping record in the host mapping 350 (block 520). If no match is found (block 530), the host IOMMU 160 denies the request and generates an error (block 535). If a match is found (block 530), which means that the requested bus address is validated, the host IOMMU 160 translates the bus address into a host physical address (block 540), and grants the DMA request for the device 150 to directly access the host physical address in the host memory 190 (block 550). At this point, the host IOMMU 160 updates the bus address in the DMA request initiated by the device 150 to the translated host physical address and allows the DMA request to continue. It is understood that the above operations may be performed in a different order; for example, the address translation at block 540 may be performed before the mapping record is checked at block 520.

Figure 6:
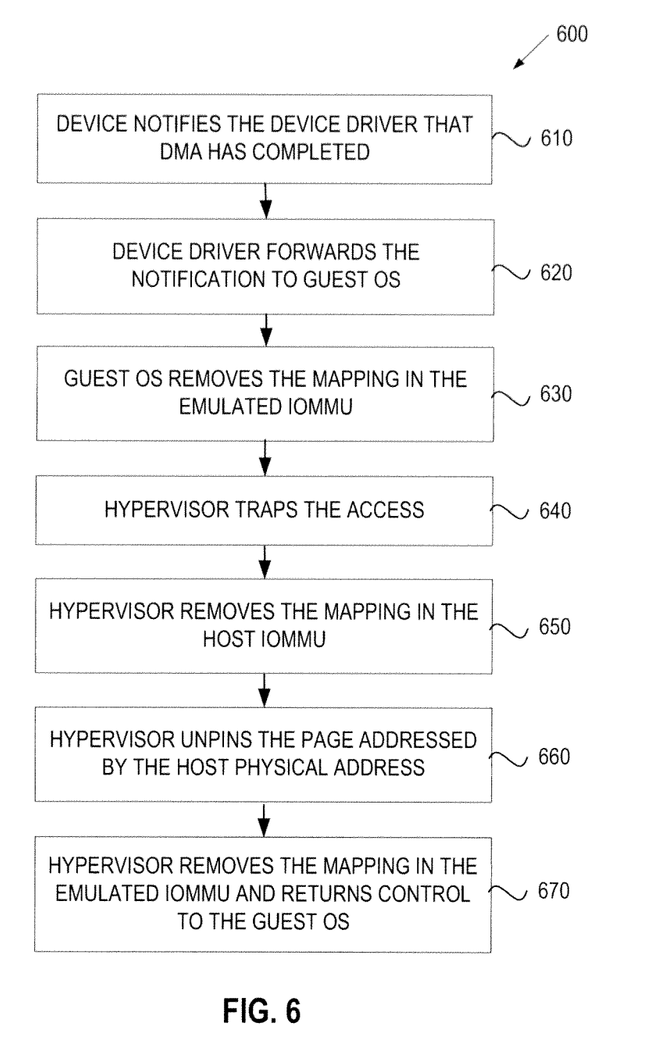
FIG. 6 is a flow diagram of one embodiment of a method for unpinning a memory page after the completion of the DMA in the computer system of FIG. 1.

FIG. 6 is a flow diagram illustrating one embodiment of a method 600 for unpinning a memory page after the completion of the DMA. The method 600 may be performed by a computer system 1000 of FIG. 10 that may comprise hardware (e.g., circuitry, dedicated logic, programmable logic, microcode, etc.), software (e.g., instructions run on a processing device), or a combination thereof. In one embodiment, the method 600 is performed by the computer system 100 of FIG. 1.

Referring to FIG. 6, in one embodiment, the method 600 begins when the device 150 notifies the device driver 142 that the DMA has completed (block 610). The device driver 142 forwards the notification to the guest OS 140 (block 620). In response to the notification, the guest OS 140 attempts to unmap (that is, remove or invalidate the mapping associated with) the bus address in the emulated IOMMU 128 (block 630). The hypervisor 125 traps the access and obtains control (block 640). In one embodiment, the hypervisor 125 unmaps (that is, removes or invalidates) the mapping record in the host IOMMU 160 that contains the mapping from (host device ID, bus address) to the host physical address (block 650). As a result, subsequent DMA requests for accessing the unmapped host physical address will not find a match and will not be granted. In one embodiment, the hypervisor 125 further unpins the page addressed by the unmapped host physical address to allow the page to be swapped out of the memory (block 660). Then the hypervisor 125 removes the corresponding mapping in the emulated IOMMU 120 and returns control to the guest OS 140 (block 670).

In some embodiments, after the page is unmapped upon completion of the DMA, the hypervisor 125 may keep the pinned page in a pool so that the page does not get swapped out right away. The pool may be shared by multiple virtual machines. When the next time the guest OS 140 requests the mapping of a DMA address in the same page, the hypervisor 125 will look-up the page in the pool first to determine whether the page is already pinned. If the page is already pinned, it means that the page is already resident in the host memory 190. Keeping the page pinned avoids the overhead of memory pinning and the cost of swapping in and out the same page within a short period of time.

In some embodiments, the hypervisor 125 may delay the unmapping and unpinning operations at blocks 650-670 upon completion of the DMA. This avoids the overhead of memory mapping and pinning the next time the guest OS 140 requests mapping of the same guest physical address. After the DMA is completed at block 610, the hypervisor 125 may keep the guest mapping 230 in the emulated IOMMU 128 as well as the host mapping 350 in the host IOMMU 160. The mappings 230, 350 may be removed when a predetermined threshold is reached; e.g., a threshold of time, a threshold of the size of the mapping, memory usage threshold, etc. The hypervisor 125 also keeps the pinned page in a pool that is exclusively used by the virtual machine on which the completed DMA took place. The pages may stay in the pool for a predetermined period of time or when the pool is full (e.g., when exceeding a predetermined size). When the pool exceeds a predetermined size, the hypervisor 125 may start unpinning and unmapping the pages according to some criteria; e.g., the pages that have not been accessed for the longest time. As long as the mappings 230, 350 of the address remain, the hypervisor 125 will keep its corresponding page (or pages) pinned in the host memory 190 to prevent the device 150 from directly accessing a non-resident page.

In another embodiment, the pattern of page mapping can be observed during operation of the virtual machine. Based on the observation, when the hypervisor 125 receives an indication from the guest OS 140 to map a page, the hypervisor 125 will predict which page or pages will be mapped next. The hypervisor 125 may map multiple pages in one batch based on the prediction. For example, the guest OS 140 may often map pages with consecutive physical addresses one after another. Thus, when the hypervisor 125 receives an indication from the guest OS 140 to map page X, it will also map page X+1.

In the embodiment of the computer system 100 (FIG. 1), there are effectively three views of IOMMU. The first view is the hardware IOMMU 160 that is part of the physical hardware platform. The second view is seen by the hypervisor 125 software that emulates a hardware IOMMU 160 for the guest OS 140. The third view, seen by the guest OS 140, appears to the guest OS 140 as a physical hardware IOMMU in the guest virtual machine. The guest OS 140 does not necessarily realize the IOMMU (the emulated IOMMU 128) it sees is emulated. Thus, there is no need to modify the guest OS 140 to work with a special IOMMU. To the guest OS 140, it appears that the guest OS 140 has a normal hardware IOMMU for which the guest OS 140 already has support.

In some embodiments, a computer system may not have a hardware physical IOMMU (e.g., the host IOMMU 160) to store address mapping and to perform address translation. This includes a computer system that has no hardware physical IOMMU within the system at all, or has a hardware physical IOMMU within the device 150 under the control of the guest OS 140. A conventional computer system handles these scenarios by granting all DMA requests without address translations. However, some of the DMA requests may be directed to an address that is non-resident in the host memory.

Figure 7:
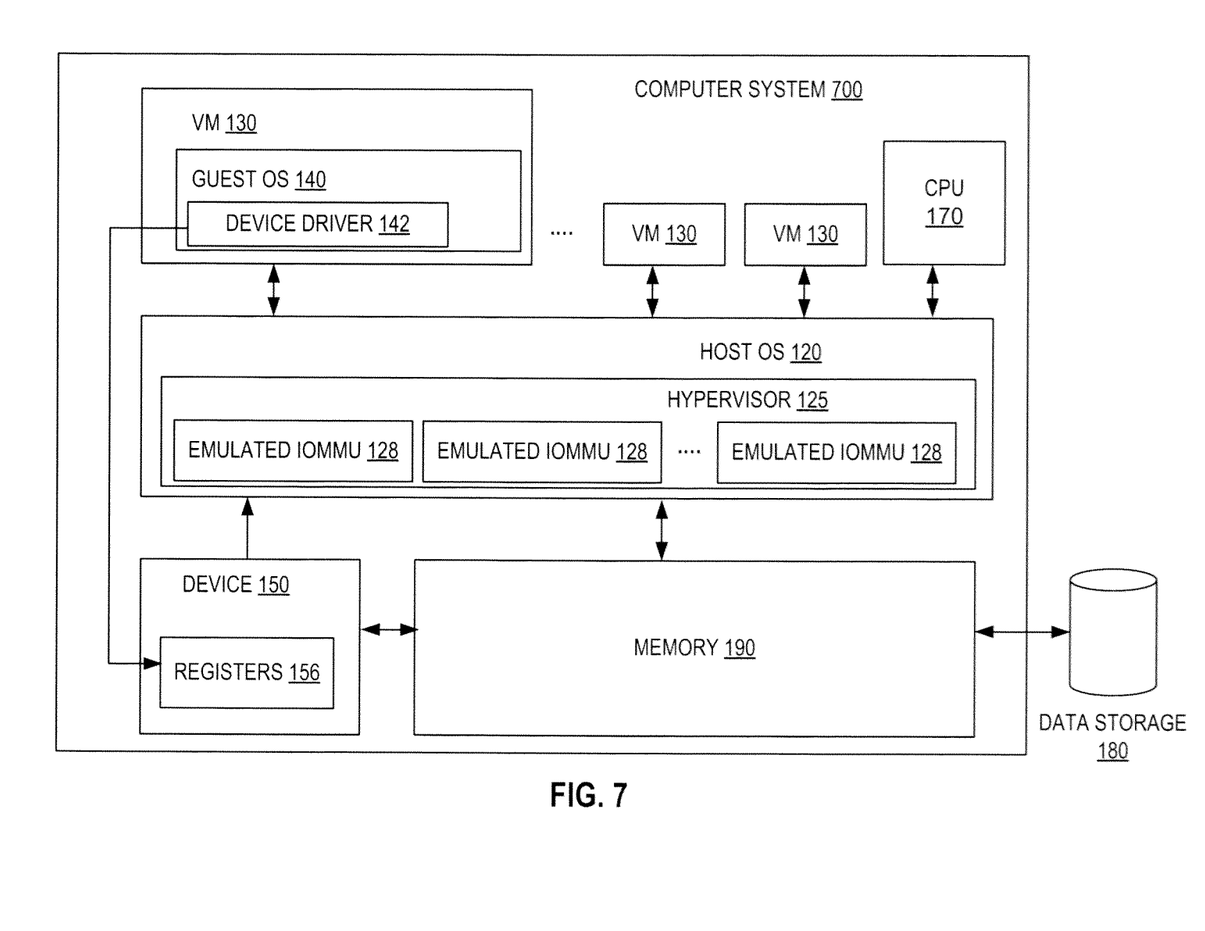
FIG. 7 is a block diagram of a computer system in which some embodiments of the invention may be implemented.

FIG. 7 is a block diagram of a computer system 700 in which some embodiments of the invention may be implemented. The computer system 700 is similar to the computer system 100 of FIG. 1, except that the computer system 700 does not have a host IOMMU. To prevent that a granted DMA request accesses a non-resident page, in one embodiment, the computer system 700 uses the host physical address as the bus address for a device to perform DMA. Thus, in this embodiment, the host physical address is the same as the bus address. In this embodiment, the guest OS 140 is trusted to use DMA addresses correctly, and the hypervisor 125 ensures that a valid DMA request will be directed to a resident page. Methods of this embodiment will be described with reference to FIGS. 8 and 9.

Figure 8:
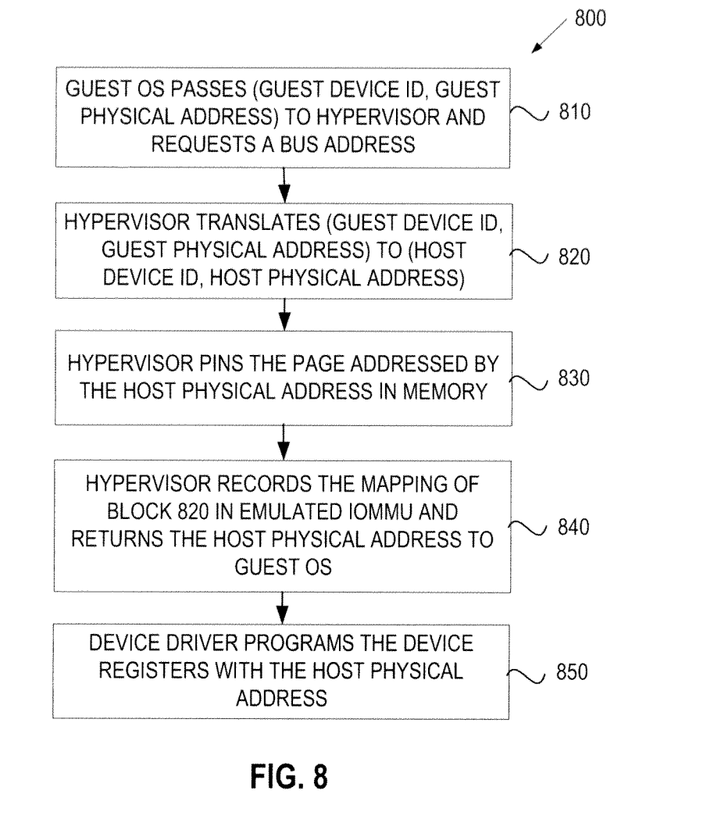
FIG. 8 is a flow diagram of one embodiment of a method for managing DMA addresses in the computer system of FIG. 7.

FIG. 8 is a flow diagram illustrating one embodiment of a method 800 for managing the addresses in a computer system without a host IOMMU. The method 800 may be performed by a computer system 1000 of FIG. 10 that may comprise hardware (e.g., circuitry, dedicated logic, programmable logic, microcode, etc.), software (e.g., instructions run on a processing device), or a combination thereof. In one embodiment, the method 800 is performed by the computer system 700 of FIG. 7.

Referring to FIG. 8, in one embodiment, the hypervisor 125 reports to the guest OS 140 that it is running on a system with an ("emulated") IOMMU 128 (the guest OS 140 typically cannot tell that the IOMMU is being emulated). Knowing the presence of the emulated IOMMU 128, the guest OS 140 attempts to program the emulated IOMMU 128. Thus, the method 800 begins when the guest OS 140 attempts to program the emulated IOMMU 128 by passing a (guest device ID, guest physical address) pair to the hypervisor 125 and requests a bus address from the hypervisor 125 (block 810). The hypervisor 125 detects this attempt and traps the access. The hypervisor 125 translates the (guest device ID, guest physical address) pair into a (host device ID, host physical address) pair (block 820). The hypervisor 125 also pins the page addressed by the host physical address in the host memory 190 (block 830). The pinning of the page, in this embodiment, indicates that a mapping of the requested address has taken place, and the requested address is currently resident in memory. The hypervisor 125 then records the mapping from the guest device ID and the bus address (in this case, the host physical address) to the guest physical address in the emulated IOMMU 128, and returns the host physical address to the guest OS 140 as the requested bus address (block 840). The device driver 142 programs the registers 156 in the device 150 with the host physical address (block 850). When the device requests a DMA with the (host device ID, host physical address) pair, the request will be granted and the corresponding page will be already resident in the host memory 190. It is understood that a DMA transaction may involve multiple bus addresses, so multiple bus addresses may be mapped in the above operations.

Figure 9:
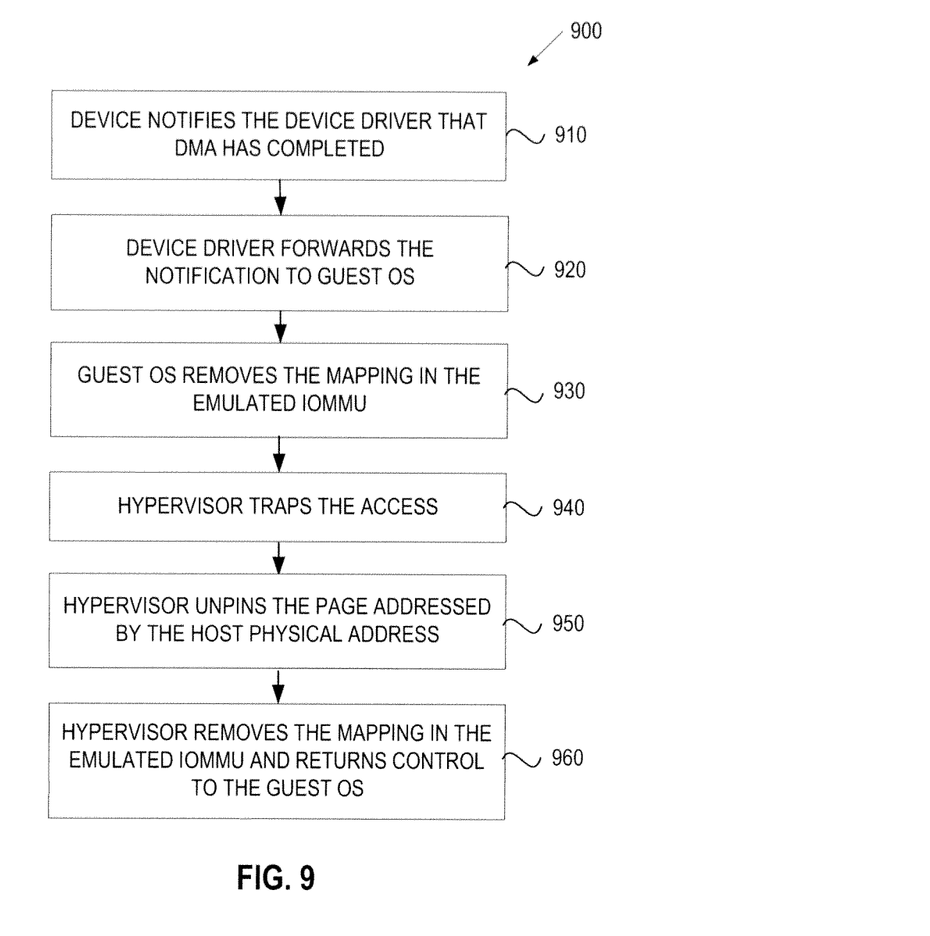
FIG. 9 is a flow diagram of one embodiment of a method for unpinning a memory page after the completion of the DMA in the computer system of FIG. 7.

FIG. 9 is a flow diagram illustrating one embodiment of a method 900 for unpinning a memory page after the completion of the DMA in a computer system without a host IOMMU. The method 900 may be performed by a computer system 1000 of FIG. 10 that may comprise hardware (e.g., circuitry, dedicated logic, programmable logic, microcode, etc.), software (e.g., instructions run on a processing device), or a combination thereof. In one embodiment, the method 900 is performed by the computer system 700 of FIG. 7.

Referring to FIG. 9, in one embodiment, the method 900 begins when the device 150 notifies the device driver 142 that the DMA has completed (block 910). The device driver 142 forwards the notification to the guest OS 140 (block 920). In response to the notification, the guest OS 140 attempts to unmap (that is, remove the mapping associated with) the bus address in the emulated IOMMU 128 (block 930). The hypervisor traps the access and obtains control (block 940). In one embodiment, the hypervisor 125 unpins the page addressed by the unmapped host physical address to allow the page to be swapped out of the memory (block 950). The hypervisor 125 then removes the corresponding mapping in the emulated IOMMU 120 and returns control to the guest OS 140 (block 960).

Similar to the computer system 100 of FIG. 1, the hypervisor 125 in the computer system 700 may delay the unpinning operation at block 950, or the unpinning and unmapping operations at blocks 950 and 960. That is, the hypervisor 125 does not necessarily unpin a page and/or unmap the address as soon as it is notified of the completion of the DMA. The hypervisor 125 may keep the pinned page in a pool when the DMA is completed, so that the page does not get swapped out right away. The hypervisor 125 may delay the unmapping and unpinning operations at blocks 950-960 upon completion of the DMA. The hypervisor 125 may map multiple pages (e.g., consecutive pages) in one batch based on the prediction of page fetching patterns. The hypervisor 125 may unpin a page in the pool when a predetermined threshold is reached. The details of these variants have been described in connection with the computer system 100 of FIG. 1 and are not repeated herein.

In the embodiment of the computer system 700 (FIG. 7), the guest OS 140 sees an IOMMU that may not behave the same as a normal hardware IOMMU. Rather, the guest OS 140 now sees a new "special" IOMMU interface, which is presented by the hypervisor 125 and does not match the hardware interface for any existing hardware IOMMU. This means the guest OS 140 may need to be modified to work with this new "special" IOMMU.

Embodiments of the present invention can be practiced in a non-virtualized environment. In a non-virtualized environment, the guest OS 140 in the computer systems 100 and 700 (FIGS. 1 and 7) may be replaced by a user space process running on an OS kernel, and the hypervisor 125 may be replaced by the OS kernel. The user space process controls the device 150 and is subject to the same mapping and pinning mechanism as described above. Memory overcommit occurs when not all of the memory allocated to the user space processes is in the host memory 190. Using the same mapping and pinning mechanism for user space processes, the host can maintain memory integrity by preventing a device from performing illegal DMA transactions or accessing invalid addresses. Direct access to a non-resident page in a memory overcommit system can also be prevented.

Figure 10:
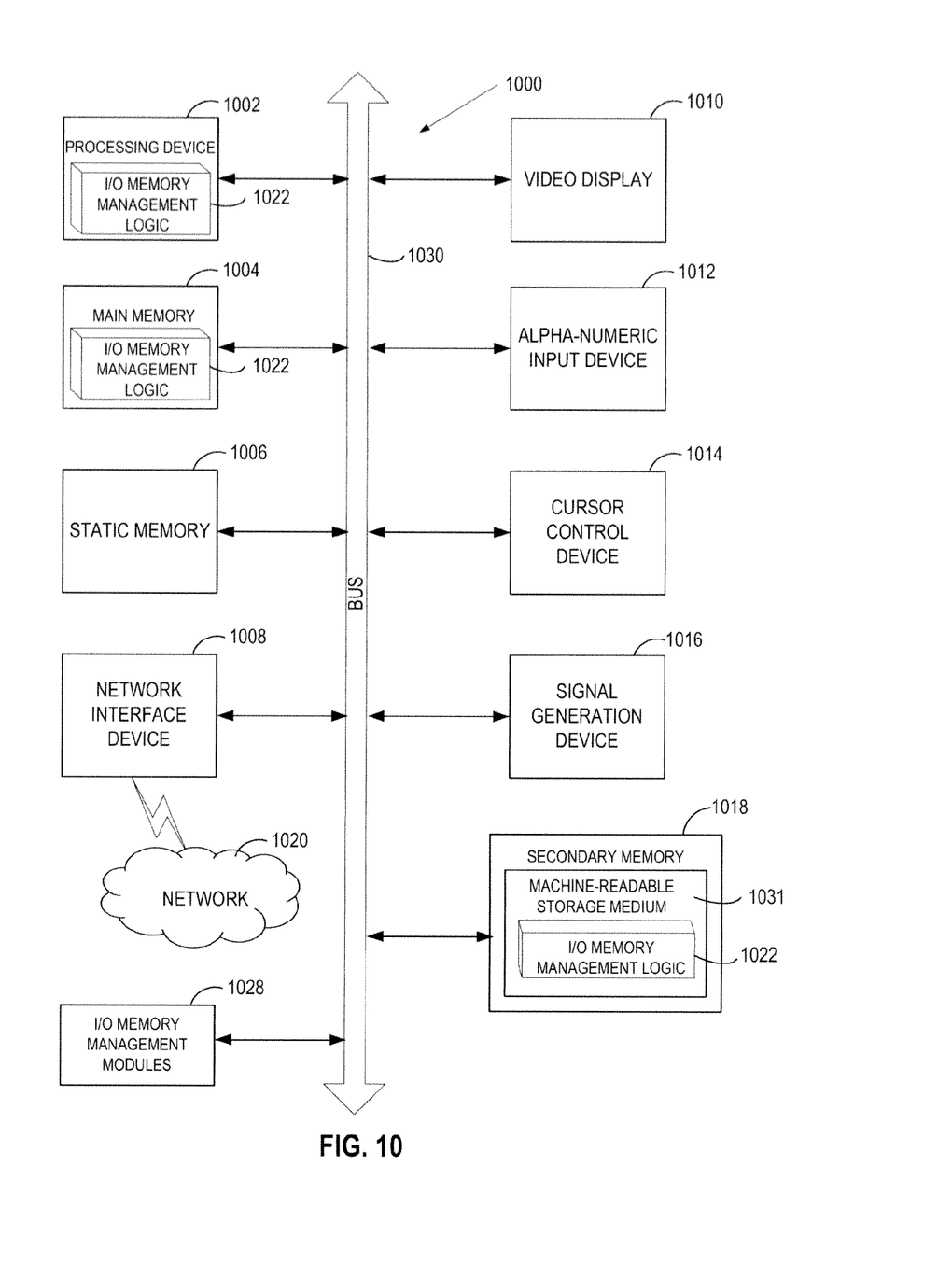
FIG. 10 illustrates a diagrammatic representation of a machine in the exemplary form of a computer system.

FIG. 10 illustrates a diagrammatic representation of a machine in the exemplary form of a computer system 1000 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory 1018 (e.g., a data storage device), which communicate with each other via a bus 1030.

The processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute I/O memory management logic 1022 for performing the operations and steps discussed herein.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The secondary memory 1018 may include a machine-readable storage medium (or more specifically a computer-readable storage medium) 1031 on which is stored one or more sets of instructions (e.g., I/O memory management logic 1022) embodying any one or more of the methodologies or functions described herein (e.g., the hypervisor 125 of FIGS. 1 and 7). The I/O memory management logic 1022 may also reside, completely or at least partially, within the main memory 1004 and/or within the processing device 1002 during execution thereof by the computer system 1000; the main memory 1004 and the processing device 1002 also constituting machine-readable storage media. The I/O memory management logic 1022 may further be transmitted or received over a network 1020 via the network interface device 1008.

The machine-readable storage medium 1031 may also be used to store the I/O memory management logic 1022 persistently. While the machine-readable storage medium 1031 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that causes the machine to perform any one or more of the methodologies of the present invention. The term "machine-readable storage medium" shall accordingly be taken to include, but not be limited to, solid-state memories, and optical and magnetic media.

The computer system 1000 may additionally include I/O memory management modules 1028 for implementing the functionalities of the hypervisor 125 of FIGS. 1 and 7. The module 1028, components and other features described herein (for example in relation to FIG. 1) can be implemented as discrete hardware components or integrated in the functionality of hardware components such as ASICS, FPGAs, DSPs or similar devices. In addition, the module 1028 can be implemented as firmware or functional circuitry within hardware devices. Further, the module 1028 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "recording", "pinning", "removing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
receiving, by a computer system, an indication that a bus address is to be used by a device to perform direct memory access (DMA) to a buffer, the buffer being managed by a guest operating system of one of a plurality of virtual machines hosted by the computer system, wherein the bus address is a physical address associated with the device;
determining, by the computer system, a host device identifier for the device based on a guest device identifier recognized by the guest operating system;
pinning, by the computer system, a memory page addressed by a host address to keep the pinned memory page in host memory, wherein the host address is associated with the bus address and a guest address of the guest operating system;
recording, by the computer system, in a host I/O memory management unit (IOMMU), a mapping of the bus address and the host device identifier to the host address; and
removing, by the computer system, the mapping after the device completes the DMA.

2. The method of claim 1, further comprising:
receiving a DMA request from the device, the DMA request indicating a requested bus address;
in response to a determination that the requested bus address is recorded in the mapping for the device, locating the buffer using the host address and granting the DMA request for accessing the buffer; and
performing the DMA using the host address.

3. The method of claim 1, further comprising:
receiving a DMA request from the device, the DMA request indicating a requested bus address; and in response to a determination that the requested bus address is not valid in the mapping for the device, denying the DMA request.

4. The method of claim 1, further comprising:
reporting, by a hypervisor of the computer system, to the guest operating system that the guest operating system is running on a guest system with an emulated IOMMU;
detecting an attempt of the guest operating system to program the emulated IOMMU with a mapping from a guest device identifier and the bus address to the guest address; and
trapping, by the hypervisor the attempt of the guest operating system.

5. The method of claim 1, wherein recording a mapping further comprises:
recording the mapping from the guest device identifier and the bus address to the guest address in the emulated IOMMU that resides in a hypervisor of the computer system.

6. The method of claim 1, wherein recording the mapping further comprises:
unpinning the memory page after the mapping is removed to allow the memory page to be swapped out of the host memory.

7. The method of claim 1, wherein recording the mapping further comprises:
keeping the memory page in a pool of pinned pages when the device completes the DMA; and
upon receiving a next indication that a second address is to be used for the DMA, determining whether the second address is in the pool.

8. The method of claim 1, wherein recording a mapping further comprises:
automatically pinning a subsequent memory page in the host memory; and
recording, in the host IOMMU, a mapping to host addresses contained in the subsequent memory page.

9. The method of claim 1, wherein removing the mapping further comprises:
keeping the mapping and the pinned memory page when receiving an indication that the device completes the DMA; and
removing the mapping when a predetermined threshold is reached.

10. The method of claim 1, wherein removing the mapping further comprises:
removing the mapping upon receiving an indication that the device completes the DMA.

11. A system comprising:
a host memory to store a hypervisor;
a computer coupled to the host memory to host a plurality of virtual machines and the hypervisor;
a device coupled to the computer and assigned to a guest operating system of one of the virtual machines, the device to perform direct memory access (DMA) to a buffer managed by the guest operating system; and
a host I/O memory management unit (IOMMU) coupled to the computer,
wherein the hypervisor, in response to an indication that a bus address is to be used by the device to perform the DMA, determines a host device identifier for the device based on a guest device identifier recognized by the guest operating system, pins a memory page addressed by a host address to keep the pinned memory page in the host memory, wherein the host address is associated with the bus address and a guest address of the guest operating system, and records, in the host IOMMU, a mapping of the bus address and the host device identifier to the host address, wherein the hypervisor removes the mapping after the device completes the DMA, and wherein the bus address is a physical address associated with the device.

12. The system of claim 11, wherein the hypervisor comprises an emulated IOMMU, wherein the emulated IOMMU stores a second mapping from a guest device identifier and the bus address to the guest address.

13. The system of claim 11, wherein the host IOMMU is to store the mapping of the bus address and the host device identifier to the host address, and wherein the host IOMMU is further to validate the bus address received from the device for performing the DMA.

14. A computer readable storage medium including instructions that, when executed by a processing system, cause the processing system to perform a method comprising:
receiving an indication that a bus address is to be used by a device to perform direct memory access (DMA) to a buffer, the buffer being managed by a guest operating system of one of a plurality of virtual machines hosted by a computer, wherein the bus address is a physical address associated with the device;
determining a host device identifier for the device based on a guest device identifier recognized by the guest operating system;
pinning a memory page addressed by a host address to keep the pinned memory page in host memory, wherein the host address is associated with the bus address and a guest address of the guest operating system;
recording, in a host I/O memory management unit (IOMMU), a mapping of the bus address and the host device identifier to the host address; and
removing the mapping after the device completes DMA.

15. The computer readable storage medium of claim 14, wherein the method further comprises:
receiving a DMA request from the device, the DMA request indicating a requested bus address; and
in response to a determination that the requested bus address is recorded in the mapping, locating the buffer using the host address and granting the DMA request for accessing the buffer; and
performing the DMA using the host address.

16. The computer readable storage medium of claim 14, wherein the method further comprises:
receiving a DMA request from the device, the DMA request indicating a requested bus address; and
in response to a determination that the requested bus address is not valid in the mapping for the device, denying the DMA request.

17. The computer readable storage medium of claim 14, wherein the method further comprises:
reporting, by a hypervisor of the computer, to the guest operating system that the guest operating system is running on a guest system with an emulated IOMMU;
detecting an attempt of the guest operating system to program the emulated IOMMU with a mapping from a guest device identifier and the bus address to the guest address; and
trapping, by the hypervisor the attempt of the guest operating system.

18. The computer readable storage medium of claim 14, wherein recording a mapping further comprises:
recording the mapping from the guest device identifier and the bus address to the guest address in an emulated IOMMU that resides in the hypervisor.

19. The computer readable storage medium of claim 14, wherein removing the mapping further comprises:
   unpinning the memory page after the mapping is removed to allow the memory page to be swapped out of the host memory.

20. The computer readable storage medium of claim 14, wherein removing the mapping further comprises:
   keeping the memory page in a pool of pinned pages when the device completes the DMA; and
   upon receiving a next indication that a second address is to be used for the DMA, determining whether the second address is in the pool.

21. The computer readable storage medium of claim 14, wherein recording a mapping further comprises:
   automatically pinning a subsequent memory page in the host memory; and
   recording, in the host IOMMU a mapping to host addresses contained in the subsequent memory page.

22. The computer readable storage medium of claim 14, wherein removing the mapping further comprises:
   keeping the mapping and the pinned memory page when receiving an indication that the device completes the DMA; and
   removing the mapping when a predetermined threshold is reached.

23. The computer readable storage medium of claim 14, wherein removing the mapping further comprises:
   removing the mapping upon receiving an indication that the device completes the DMA.

* * * * *